J. H. LEITCH.
FUEL GAGE.
APPLICATION FILED JUNE 3, 1915.
1,304,069.
Patented May 20, 1919.
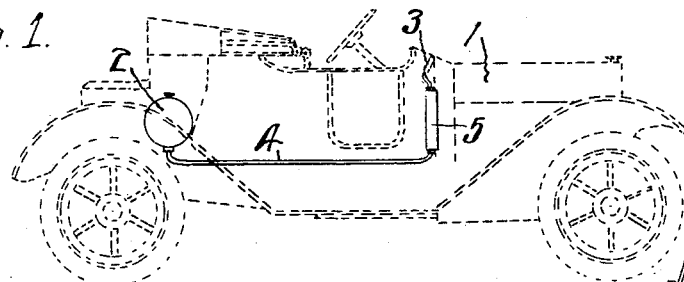
Fig. 1.
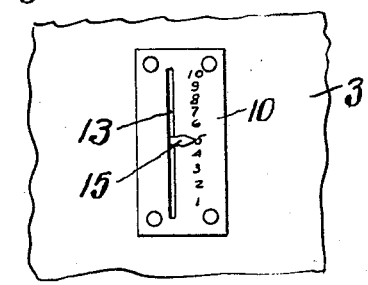
Fig. 2.
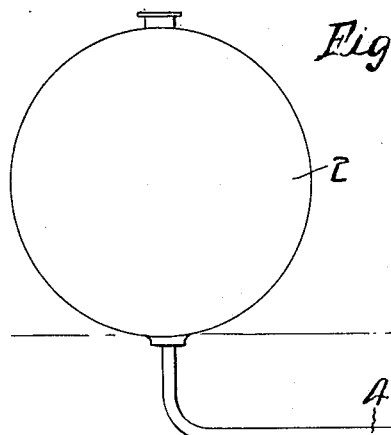
Fig. 3.
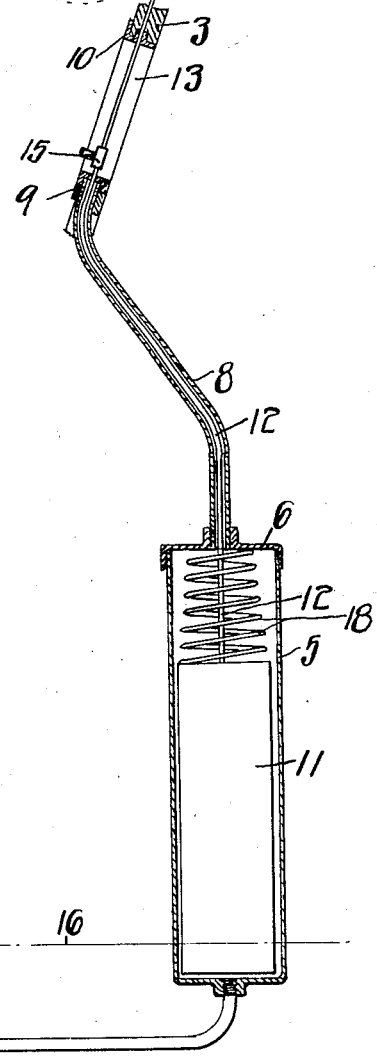
Inventor
John H. Leitch,
By Pagelsen & Spencer
Attorneys

UNITED STATES PATENT OFFICE.

JOHN H. LEITCH, OF DETROIT, MICHIGAN.

FUEL-GAGE.

1,304,069.   Specification of Letters Patent.   Patented May 20, 1919.

Application filed June 3, 1918. Serial No. 237,999.

*To all whom it may concern:*

Be it known that I, JOHN H. LEITCH, a citizen of the United States, and residing at 628 Cass avenue, Detroit, in the county of Wayne and State of Michigan, have invented a new and Improved Fuel-Gage, of which the following is a specification.

The present invention has reference to means whereby the driver of a motor vehicle may be kept advised of the depth of fuel in the tank, the object being to provide a construction that may be manufactured at a very low cost, and is one which may be readily applied to various makes of cars.

In the drawings, Figure 1 is a diagrammatic side view of a motor vehicle, indicating one embodiment of the invention. Fig. 2 is an enlarged diagrammatic view, mostly in section, whereby the construction is more clearly shown. Fig. 3 is a view looking forwardly and showing one form of indicating device mounted on the instrument board.

The vehicle 1 is of ordinary construction, the full tank being shown at 2 and the instrument board appearing at 3, while the fuel tank is shown elevated rearwardly of the seat; it will be understood that it may be positioned elsewhere as, for example, under the seat, or at the extreme rear end of the frame as is common practice.

Extending forwardly from the tank is a pipe 4, which leads to the lower end of an upright float chamber 5, positioned at a point below and conveniently near the instrument board, and held in place in a suitable manner. The upper end is closed by a cap 6, which may be threaded thereon, and a piece of pipe 8, say copper, of small diameter is bent about as shown and connects at 9, to a suitable gage housing or plate 10. Inclosed in the tank is a float 11, which may be of the hollow sheet metal type, and fixed to the upper end of the latter in any convenient manner is a wire 12, that passes up through the pipe 8. This wire is stiff enough to readily transmit movement of the float and yet flexible enough to conform to the bend or bends in the pipe, as will be readily understood, and has its upper end arranged to coöperate with any suitable type of indicator whereby the driver may tell at a glance the depth of fuel in the tank.

In the embodiment shown, the gage, which is selected largely because of its cheapness, is formed by extending the wire 12, through a slot 13, formed in the housing or plate 10, and carries a pointer 15, arranged to move over the calibrated face of the plate to give the desired indication. Any other desired type of indicator may be used in place of that shown in the drawing as my invention is not limited thereto.

The preferred relation of the bottom of the tank 2, to the float chamber 5, when the car is standing on level ground appears from the horizontal line 16, Fig. 3, from which it will be understood that the float, is under these conditions, ready to rise immediately when fuel is poured into the tank. Inasmuch as the depth of the tank 2, is greater than the distance which it would be feasible to move the pointer 15, or its equivalent, it is prefered to interpose between the cap 6 and the upper end of the float a light spring 18, which is desirably of the tapering helical type, so that the movement of the float may be confined within proper limits, in which case the graduations on the dial 10, would obviously not be uniformly spaced.

The device is exceedingly cheap to manufacture, and adapts itself readily to such variations as occur in ordinary cars. Various changes, otherwise than as stated, may be made in the details of construction without departing from the spirit of the invention and I do not, therefore, wish to be limited except as indicated by the subjoined claims.

I claim:—

1. In mechanism of the class described, a float chamber, a float movable therein, a spring constantly opposing the upward movement of the float, an indicator, a pipe joining the indicator and float chamber, a flexible wire passing through the pipe and movable by the float to actuate the indicator.

2. In mechanism of the class described, an upright tubular float chamber, a float movable up and down therein, a spring interposed between the float and the upper end of the float chamber and constantly restraining the upward movement of the float, a pipe leading upwardly from the float chamber, a flexible wire passing through the pipe and movable with the float, and an indicating member movable with said wire.

3. Means for indicating the depth of fuel in the tank of a motor vehicle comprising an indicator mounted on the instrument board of the vehicle, a float chamber below the instrument board and in communication with the tank, a bent pipe extending from the tank to the indicator, a float within the float chamber, a spring mounted on the float to constantly restrain the upward movement thereof, and a flexible wire passing through the pipe and movable by the float to actuate the indicator.

JOHN H. LEITCH.